United States Patent
Lindmayer

(10) Patent No.: US 9,696,731 B2
(45) Date of Patent: Jul. 4, 2017

(54) PRESSURE REGULATING DEVICE

(75) Inventor: Istvan Stephen Lindmayer, Dobrokoz (HU)

(73) Assignee: EUROJET MEDICAL KFT., Budapest (HU)

( * ) Notice: Subject to any disclaimer, the term of this patent is extended or adjusted under 35 U.S.C. 154(b) by 192 days.

(21) Appl. No.: 13/996,653

(22) PCT Filed: Dec. 19, 2011

(86) PCT No.: PCT/HU2011/000128
§ 371 (c)(1),
(2), (4) Date: Aug. 20, 2013

(87) PCT Pub. No.: WO2012/085607
PCT Pub. Date: Jun. 28, 2012

(65) Prior Publication Data
US 2015/0034181 A1    Feb. 5, 2015

(30) Foreign Application Priority Data
Dec. 21, 2010    (HU) .................................. 1000680

(51) Int. Cl.
*G05D 16/06* (2006.01)
*G05D 16/08* (2006.01)

(52) U.S. Cl.
CPC ......... *G05D 16/0647* (2013.01); *G05D 16/08* (2013.01); *Y10T 137/7825* (2015.04)

(58) Field of Classification Search
CPC ...... G05D 16/06; G05D 16/08; G05D 16/063; G05D 16/0644; G05D 16/0647;
(Continued)

(56) References Cited

U.S. PATENT DOCUMENTS 255,517 A * 3/1882 Lacey ..................... 137/505.41
1,475,123 A * 11/1923 Laird .............................. 251/58
(Continued)

FOREIGN PATENT DOCUMENTS

GB         989224 A     4/1965
WO      03017020 A1     2/2003

*Primary Examiner* — Mary McManmon
*Assistant Examiner* — Richard K Durden
(74) *Attorney, Agent, or Firm* — Pearne & Gordon LLP

(57) ABSTRACT

The pressure regulating device (10) is adapted to be interposed between a pressurized fluid supply and a fluid receiving space into which the pressurized fluid is discharged at a regulated reduced pressure. The device (10) including a housing (12) and a diaphragm assembly (30), wherein the housing (12) includes an apparatus for coupling to the pressurized fluid supply in a sealed manner, and a diaphragm chamber (18) adapted to communicate with the fluid receiving space through a fluid discharging passage (23) and being separated from the pressurized fluid supply by a barrier wall (26) having a central port (28) extending therethrough, wherein the diaphragm assembly (30) includes an elastic diaphragm (31) connected to a throttle head (34) by a stem (32), the stem (32) extending through the central port (28) to define a flow passage therein, and the diaphragm (31) being secured along its periphery to the housing (12) so that in its initial position, the diaphragm (31) rests on a planar upper surface of the barrier wall (26).

15 Claims, 10 Drawing Sheets

(58) Field of Classification Search
CPC ............ G05D 16/065; Y10T 137/7825; Y10T 137/7835; Y10T 137/7836; Y10T 137/782
USPC ...................................... 137/505.41; 222/399
See application file for complete search history.

(56) References Cited

U.S. PATENT DOCUMENTS

| | | | | |
|---|---|---|---|---|
| 2,320,886 | A | * | 6/1943 | Quiroz ........................ 137/505.2 |
| 3,412,650 | A | * | 11/1968 | Stang, Jr. ............ G05D 16/0661 |
| | | | | 137/505.41 |
| 3,613,954 | A | * | 10/1971 | Bayne ................... B67D 1/0412 |
| | | | | 222/399 |
| 4,739,770 | A | | 4/1988 | Stephens et al. |
| 5,303,599 | A | * | 4/1994 | Welker .................... F04B 43/06 |
| | | | | 73/863.84 |
| 6,619,308 | B2 | | 9/2003 | Massengale et al. |
| 6,874,521 | B1 | * | 4/2005 | Amidzich ........................ 137/12 |
| 6,938,642 | B2 | | 9/2005 | Massengale et al. |
| 7,114,520 | B2 | | 10/2006 | Massengale et al. |
| 7,264,018 | B2 | | 9/2007 | Massengale et al. |
| 7,546,846 | B2 | | 6/2009 | Massengale et al. |
| 7,766,028 | B2 | | 8/2010 | Massengale et al. |
| 2002/0047053 | A1 | * | 4/2002 | Bron ............................ 239/542 |
| 2002/0104569 | A1 | | 8/2002 | Massengale et al. |
| 2004/0041119 | A1 | * | 3/2004 | Christen et al. .............. 251/331 |
| 2004/0123906 | A1 | | 7/2004 | Massengale et al. |
| 2005/0285064 | A1 | * | 12/2005 | Yoshino .............. F16K 31/1221 |
| | | | | 251/61.5 |
| 2006/0048822 | A1 | | 3/2006 | Massengale et al. |
| 2007/0017580 | A1 | | 1/2007 | Massengale et al. |
| 2007/0289644 | A1 | | 12/2007 | Massengale et al. |
| 2009/0250124 | A1 | | 10/2009 | Massengale et al. |

* cited by examiner

PRESSURE REGULATING DEVICE

FIELD OF THE INVENTION

The present invention relates to a pressure regulating device.

DESCRIPTION OF RELATED ART

A pressure regulating device functions to maintain a fluid quantity, such as fluid pressure or flow velocity, at a substantially constant and preset level. A pressure regulating device normally operates to reduce the high pressure of a gas or liquid stored in a pressurized container or a cartridge to a desired lower pressure suitable for use in a particular application.

Document WO 03/017020 discloses a pressure regulator control device, wherein instead of having a conventional spring located above and/or below an elastic diaphragm, a resilient diaphragm is employed that by itself regulates output pressure. The diaphragm is made of an elastomeric material, and is designed not only to act as a diaphragm, but also to replace the pressure sensing spring and/or the valve seat spring. This device has the drawback that the diaphragm, in its initial position, is stretched in the space within the valve housing. This configuration of the diaphragm requires a separate moulding of the diaphragm and the rigid valve housing and a subsequent assembly thereof to carry out the device. Furthermore, this device is provided with an adjuster to set the desired lower pressure via an adjusted initial deflection of the elastomeric diaphragm towards the central port. Moreover, during use, the adjuster exerts a steady pushing force to the diaphragm's upper surface along a circular line, which results in a continuous shearing force acting on the diaphragm, said shearing force possibly causing a faster aging of the material of the elastomeric diaphragm.

It is therefore an object of the present invention to eliminate at least the above mentioned drawbacks.

SUMMARY OF THE INVENTION

The above objects are achieved by providing a pressure regulating device adapted to be interposed between a pressurized fluid supply and a fluid receiving space into which the pressurized fluid is discharged at a regulated reduced pressure, said device comprising a housing and a diaphragm assembly, wherein said housing comprises a means for coupling to said pressurized fluid supply in a sealed manner, and a diaphragm chamber adapted to communicate with said fluid receiving space through a fluid discharging passage and being separated from said pressurized fluid supply by a barrier wall having a central port extending therethrough, wherein said diaphragm assembly comprises an elastic diaphragm connected to a throttle head by a stem, said stem extending through said central port to define a flow passage therein, and said diaphragm being secured along its periphery to said housing so that in its initial position, the diaphragm rests on a planar upper surface of said barrier wall, and wherein said housing is made of a rigid gas-tight plastic material, and wherein said diaphragm, said stem and said throttle head are integrated into one piece as a diaphragm assembly, said integrated piece being made of an elastic gas-tight plastic material.

Preferred embodiments of the invention are specified by the dependent claims.

A significant feature of the pressure regulating device according to the invention is that it does not comprise a separate helical compression spring to compensate the high compressing force exerted by the pressurized fluid to the surface of the diaphragm, but the diaphragm itself incorporates such a spring function due to its appropriate material selection and dimensioning. Therefore the need of using a separate, compression spring is eliminated and thus the design of the whole valve is significantly simplified, resulting in two basic parts, i.e. a valve housing and a diaphragm assembly. As both of these two parts may be made from plastic materials, a low-cost, disposable and recyclable pressure regulating valve may be produced in mass production. Furthermore, since in its initial position, the elastic diaphragm rests on the upper planar surface of the barrier wall, it is easy to produce the entire valve assembly by means of a single injection die, without the need of subsequently assembling various separately moulded parts (i.e. the elastic diaphragm and the rigid housing).

BRIEF DESCRIPTION OF THE DRAWINGS

The present invention will now be described through preferred embodiments thereof with reference to the accompanying drawings, in which.

DETAILED DESCRIPTION OF PREFERRED EMBODIMENTS OF THE INVENTION

Figure 1A:
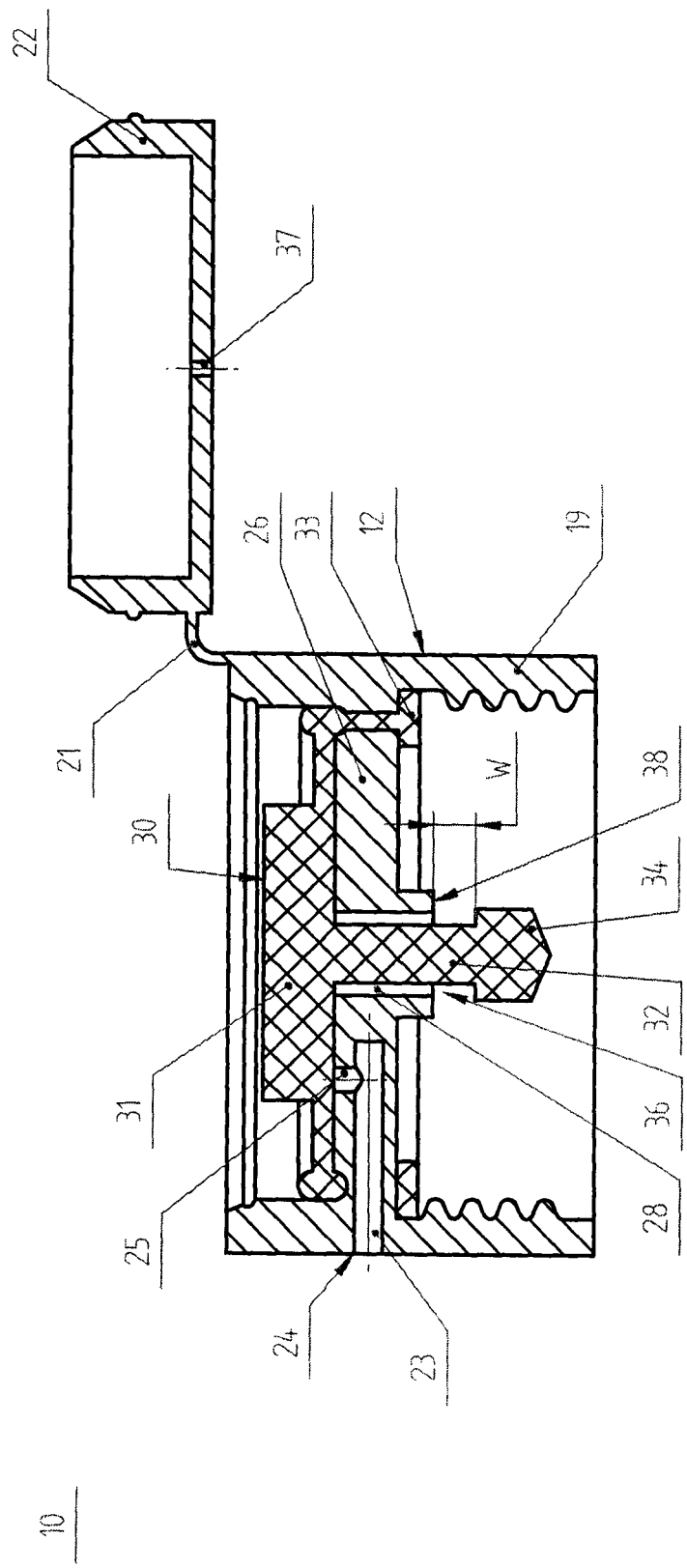
FIGS. 1a and 1b illustrate cross-sectional views of a first preferred embodiment of the pressure regulating device according to the invention with an opened cover and a closed cover of the valve housing, respectively.
Figure 1B:
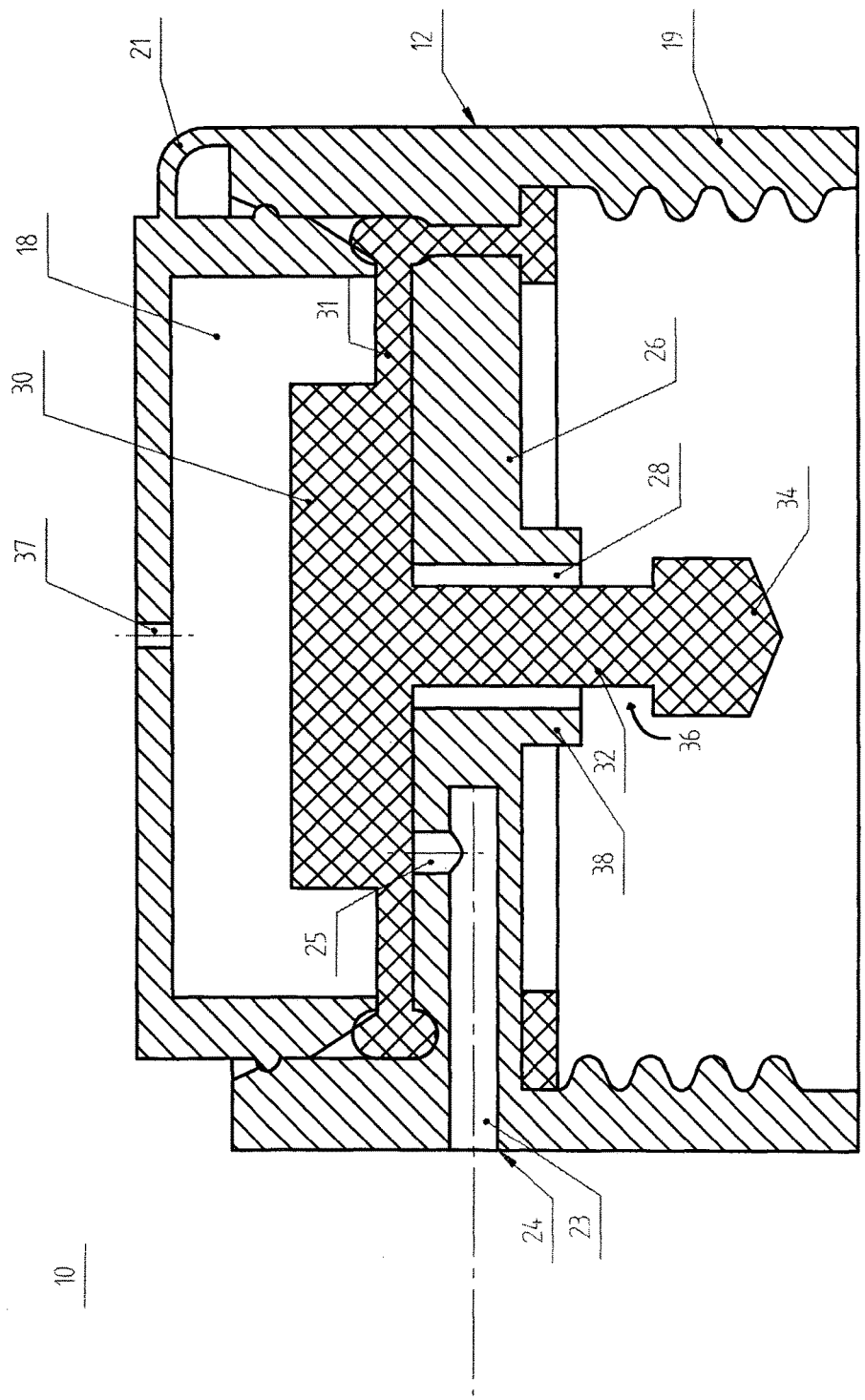

A first preferred embodiment of the pressure regulating device according to the invention is illustrated in FIGS. 1a and 1b in cross-sectional views. As the first embodiment is particularly suitable for production by injection-moulding, FIG. 1a shows an arrangement of the valve immediately after finishing in an injection mould, whereas FIG. 1b shows this embodiment in an arrangement of normal use, wherein the pressure regulating device is interposed between a pressurized fluid supply and a fluid receiving space into which the pressurized fluid is to be discharged at a regulated reduced pressure.

The pressurized fluid may be either a pressurized gas or a pressurized liquid. Accordingly, the pressurized fluid supply may be, for example, a high-pressure gas container for pressurized liquids, such a high-pressure carbon dioxide cartridge for carbonated drinks or other high-pressure technological gas containers, or a pressurized liquid container, such as a pressurized medicine cartridge for a needleless vaccinating syringe, etc.

The pressure of the fluid supply and the regulated reduced pressure strongly depend on the particular application in which the fluid material is used. In practice, the pressure initially prevailing in the pressurized fluid supply is typically a few tens of a bar, whereas the reduced pressure to be achieved by the pressure regulation typically ranges from a few tenths of a bar to a few bars. However, other pressures ranges are also appreciated in specific applications.

As shown in FIGS. 1a and 1b, the pressure regulating device 10 may comprise a housing 12 and a diaphragm assembly 30, these two components forming the basic parts of the pressure regulating device of the invention.

The housing 12 has a high-pressure section adapted to be connected to a pressurized fluid supply (not shown), a low-pressure section to be connected to a fluid receiving space (not shown) and a diaphragm chamber 18 interposed between said high-pressure and low-pressure sections.

The high-pressure section incorporates all portions and parts of the valve housing 12 that are associated with the pressurized fluid supply containing a high-pressure fluid, in particular a coupling means for mounting the valve housing 12 onto a fluid supply in a gas-tight manner. To this end, the high-pressure section may, for example, comprise a threaded collar 19 adapted for coupling to a corresponding threaded portion of the pressurized fluid supply. However, other types of coupling means, such as snap fitting or welding, may also be applied to sealingly couple the valve housing 12 to a pressurized fluid supply, wherein all such techniques are well known for a skilled person.

The low-pressure section, on the other hand, incorporates the diaphragm chamber 18, a cover 22 of the housing 12 and a fluid discharging passage 23 extending through a wall of the low-pressure section of the housing 12. The fluid discharging passage 23 has an orifice 24 opening into the fluid receiving space. Depending on the particular field of application of the pressure regulating device according to the invention, several other parts or portions may be formed in the low-pressure section, some preferred parts of which will be introduced below as non-limiting examples.

In an alternative embodiment of the pressure regulating device, the cover of the low-pressure section may be formed separately from the main body of the housing and secured thereto in a sealed manner, for example by threaded, snap fitting or welded connection, after the diaphragm assembly is formed within the housing.

The housing 12 is made of a rigid plastic material, preferably a high-density injection-mouldable plastic material, such as HD polyethylene, polypropylene, etc. Preferably, the entire housing 12 forms a single piece allowing to produce the housing 12 by using one injection mould. To this end, it is particularly preferred that the housing 12 comprises a cover 22 that may be initially attached to the housing by means of a foldable hinge 21, as shown in FIG. 1b that illustrates the device immediately after moulding, in an arrangement produced by the mould.

The diaphragm chamber 18 is separated from the high-pressure fluid space of the pressurized fluid supply by a barrier wall 26, wherein said barrier wall 26 thus also provides a separation between the high-pressure section and the low-pressure section of the housing. The barrier wall 26 has a central port 28 extending therethrough to allow the pressurized fluid to flow from the pressurized fluid supply into the diaphragm chamber 18, in which during operation, a reduced pressure is generated by means of the diaphragm assembly 30. To discharge the reduced pressure fluid from the diaphragm chamber 18, the diaphragm chamber 18 is designed to be in communication with the fluid receiving space through said fluid passage 23.

As shown in FIGS. 1a and 1b, the fluid discharging passage 23, through which the diaphragm chamber 18 communicates with the fluid receiving space, is formed within the barrier wall 26, said discharging fluid passage 23 connecting an inner discharging orifice 25 to said outer orifice 24, wherein the inner orifice 25 is formed to communicate with an inner space portion of the diaphragm chamber 18 that receives the fluid from the pressurized fluid supply during operation of the device 10. This inner space portion of the diaphragm chamber 18 is shown underneath the diaphragm 31 in FIG. 5 (denoted by 127a).

In a preferred embodiment of the pressure regulating device, the barrier wall 26 comprises a raised portion 38 around the central port 28 to define a valve seat for a throttle head of the diaphragm assembly.

As can be seen in FIGS. 1a and 1b, the diaphragm chamber 18 may comprise a ventilation hole 37 in communication with the ambient environment.

In an alternative embodiment of the pressure regulating device (not shown), there is no ventilation hole formed in the housing, meaning that an outer space portion of the diaphragm chamber on the opposite side of the diaphragm is entirely closed. In this embodiment, said outer space portion of the diaphragm chamber should be filled with a gas (e.g. air) that provides a compressible medium serving as a kind of gas spring that acts to the entire outer surface of the diaphragm.

Figure 8:
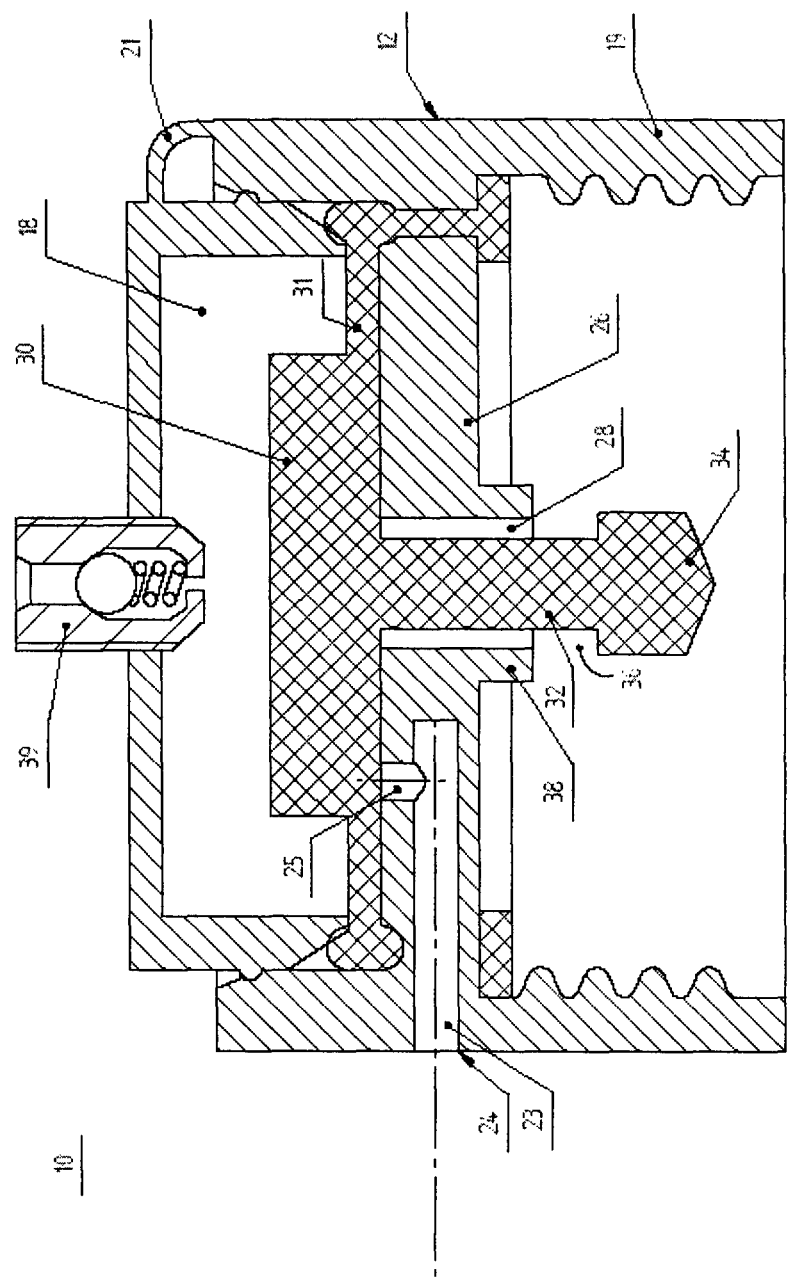
FIG. 8 illustrates a cross-sectional view of the third embodiment of the pressure regulating device.

In a further preferred embodiment of the pressure regulating device, as shown in FIG. 8, the diaphragm chamber 18 may be provided with a bidirectional valve 39 that allows the adjustment of the gas pressure in the outer space portion of the diaphragm chamber 18. Through the bidirectional valve 39, the required quantity of gas can be filled into the outer space portion of the diaphragm chamber 18, or the excessive quantity of gas can be released from the outer space portion of the diaphragm chamber 18 in order to set the desired gas pressure within said space. In this way, the regulated lower pressure can be easily adjusted without the use of an additional adjuster tool. Moreover, the pressure of the gas in the outer space portion of the diaphragm chamber 18 acts to the entire upper surface of the diaphragm 31 in a substantially uniform fashion, thus avoiding the action of any shearing force to the diaphragm 31. Consequently, even a pressure of approximately 100 bars may be reduced to a regulated pressure of a few bars when an appropriately high gas pressure is provided in the outer space portion of the diaphragm chamber 18.

Returning to FIGS. 1a and 1b, the diaphragm assembly 30 comprises a diaphragm 31 connected to a throttle head 34 by a stem 32. The throttle head 34 is arranged in the high-pressure section of the housing 12. The stem 32 extends through the central port 28 formed in the barrier wall 26. Between the stem 32 and the inner wall of the central port 28 a flow passage is defined for the pressurized fluid. The throttle head 34 cooperates in spaced relationship with the barrier wall 26, preferably said raised portion 38 of the barrier wall 26, to define an orifice 36 leading to said flow passage within the central port 28.

The initial width W of the orifice 36 is dimensioned so that a sufficient amount of fluid can flow from the pressurized fluid supply to the central port 28 while this latter is not closed by the throttle head 34.

The diaphragm 31 is made of a elastomeric material, preferably an injection-mouldable thermoplastic material, such as Santoprene™, Evoprene™, Megol™, Tivilon™, etc. The diaphragm 31 is secured along its periphery to the valve housing 12. As shown in FIG. 1a, the periphery of the diaphragm 32 may be formed to have a sealing ring 33 to provide a gas-tight seal between the pressurized fluid supply and the valve housing 12.

It is particularly preferred that the diaphragm 31 has a central portion with an increased thickness relative to its peripheral portion. In this embodiment, the central portion of the diaphragm 31 is substantially undeformable (i.e. although made of an elastomeric material, its deformation during use should be negligible), meaning that only the peripheral portion of the diaphragm 31 will actually serve as a spring. When the central portion of increased thickness is made rather rigid, a more precise adjustment of the regulated pressure is allowed because during use, deformation of the thickened central portion of the diaphragm is negligible and thus hardly any mechanical energy is absorbed thereby, which facilitates the calculation of the operational forces in the device.

Furthermore, when a foldable cover 22 is used to form a sealed outer space portion of the diaphragm chamber 18, the diaphragm 31 may be secured between a circular edge of the folded cover 22 and the barrier wall 26. These preferred features are also illustrated in FIGS. 1a and 1b.

Due to an appropriate material selection and dimensioning of the diaphragm 31, it provides itself the desired spring function to compensate the high compressing force exerted by the pressurized fluid to the surface of the high-pressure side of the diaphragm 31. Therefore the need of using a separate compression spring is eliminated.

As shown in FIGS. 1a and 1b, the diaphragm 31, the stem 32 and the throttle head 34 are formed as a single integrated piece defining said diaphragm assembly 30 and the whole integrated piece is made of a gas-tight elastomeric material like mentioned above. This feature of the invention is particularly advantageous with regard to manufacturing since such a diaphragm assembly may thus be produced in one step, for example, by injection-moulding.

It is also preferred that the single piece valve housing and the single piece diaphragm assembly is made by using a two component moulding technology where one mould subsequently receives two different kinds of plastic, i.e. first a rigid type plastic to form the housing and then a rather soft, elastic plastic to form the diaphragm assembly. In this way, the complete pressure regulating device may be produced in one step, typically within a few seconds. Such a pressure regulating device is shown in FIG. 1a after its removal from the mould. The aforementioned two component injection-moulding technology significantly reduces the manufacturing costs and thus allows mass production of the pressure regulating device of the invention. Due to its very economical production, the pressure regulating device may be disposable and therefore especially beneficial, e.g. for use in sterile medical products or in cheap PET bottles of carbonated beverages. Moreover, if the pressure regulating device is made of solely plastic materials, it will be particularly suitable for recycling, which is also an important feature of the invention in view of environmental protection.

Figure 2:
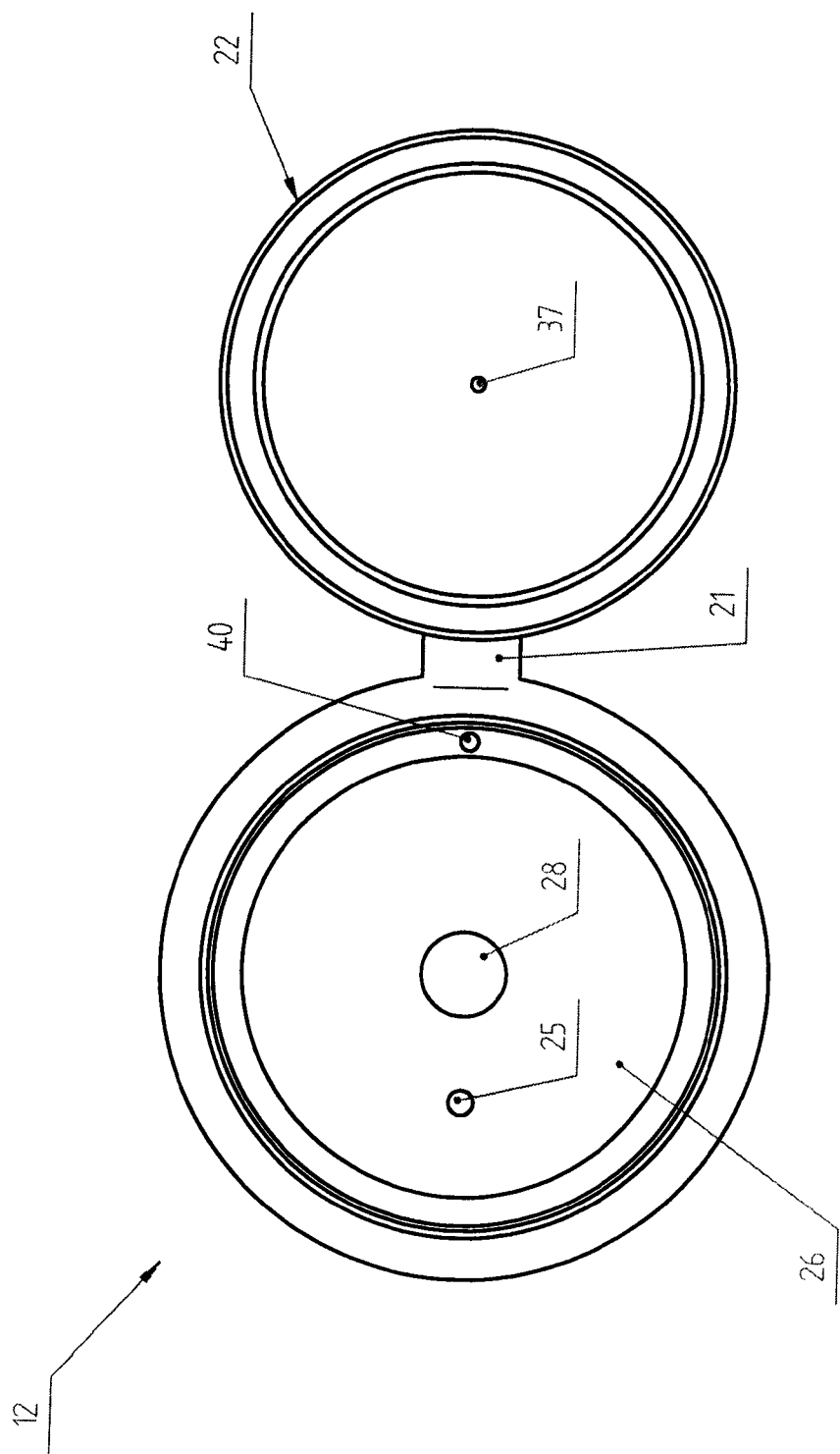
FIG. 2 is a top plan view of the housing when the cover is in its initial, unfolded position, according to the first embodiment of the invention.

In FIG. 2, the housing 12 is illustrated in a top plan view when the cover 22 is in its initial, unfolded position. The cover 22 of the housing 12 is attached to the main body of the housing 12 via the flexible hinge 21. The hinge 21 is made of the same rigid plastic material as the housing 12, but due to its rather small wall thickness, it provides a flexible connecting member allowing the cover 22 to be folded over the main body of the housing 12 to define a diaphragm chamber.

As shown in FIG. 2, the central port 28 and the inner discharging orifice 25 is formed in the barrier wall 26. At its periphery, the barrier wall 26 may further comprise a through-hole 40 as a technological duct for the injection-moulding when a sealing ring 33 (shown in FIG. 1a) is to be made integrally with the diaphragm.

Figure 3A:
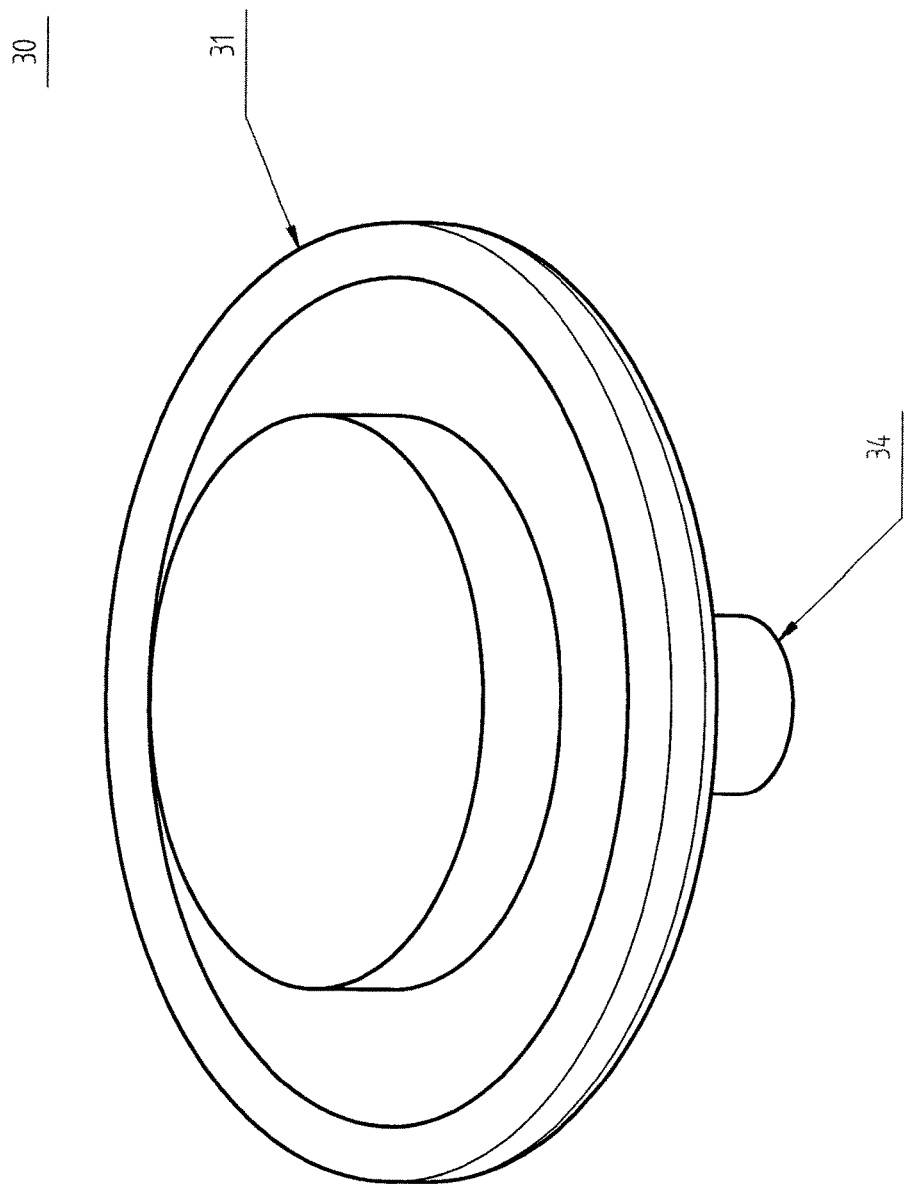
FIGS. 3a and 3b are perspective views of the upper side and the bottom side of the diaphragm assembly, respectively, according to the first embodiment of the invention.
Figure 3B:
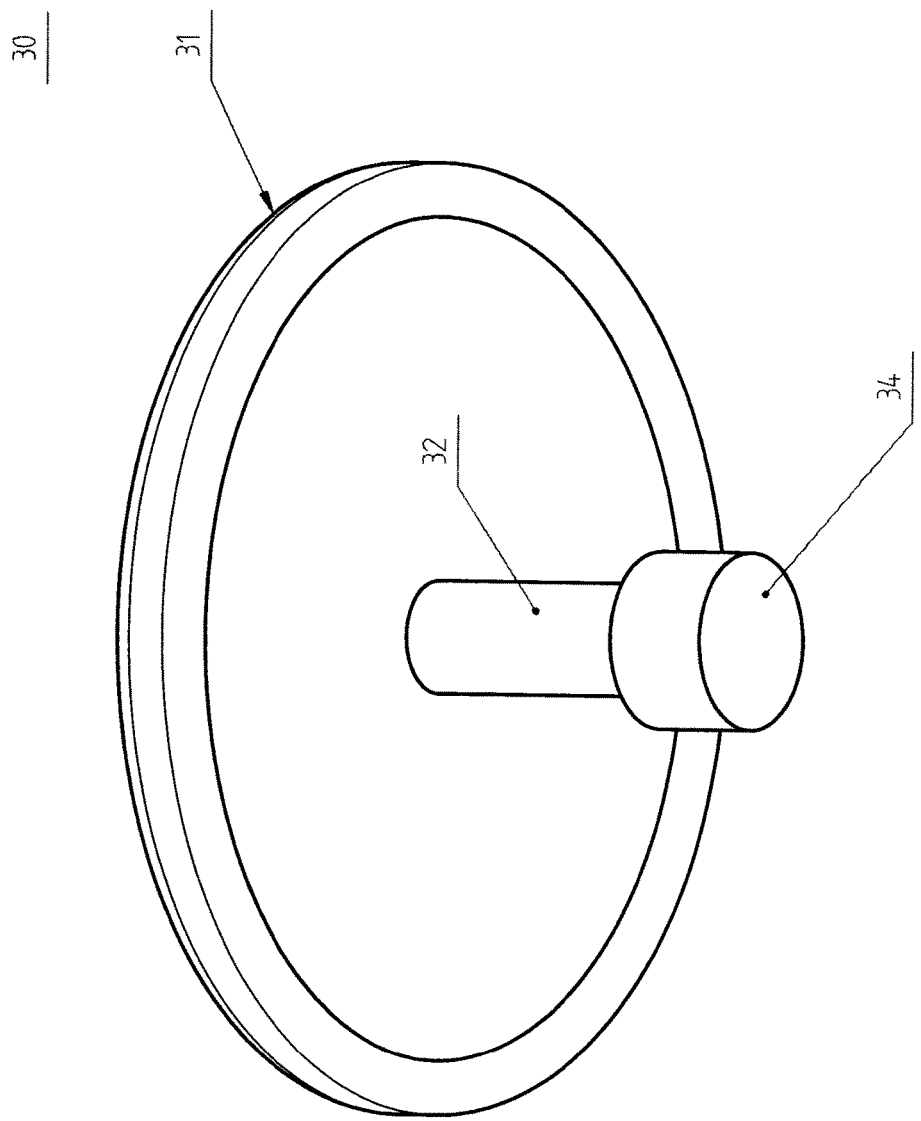

FIGS. 3a and 3b illustrate, in perspective views, the upper side and the bottom side of the diaphragm assembly 30, respectively. The diaphragm assembly 30 shown in these figures has a rather simple design comprising only the diaphragm 31, the valve stem 32 and the throttle head 34, while not comprising the optional bottom sealing ring. Due to the very simple design of this diaphragm assembly 30, it can be easily made as one piece from a plastic material, for example, by injection-moulding.

EXAMPLE

A pressure regulating head was manufactured and tested for a gas cartridge filled up with Nitrogen gas at an initial pressure of 16 bars. The diaphragm assembly was made of Santoprene™ thermoplastic. The diameter of the diaphragm was 40 mm and the thickness of the periphery of the diaphragm was 2 mm. The free flow area for the gas within the central port of the barrier wall was about 2.5 mm2, while the initial distance (W) between the valve seat and the throttle head was 6 mm. The aforementioned parameters resulted in a reduced regulated pressure of about 2 bars. During discharging the gas from the gas cartridge, the oscillation frequency of the diaphragm was about 60 Hz.

Figure 5:
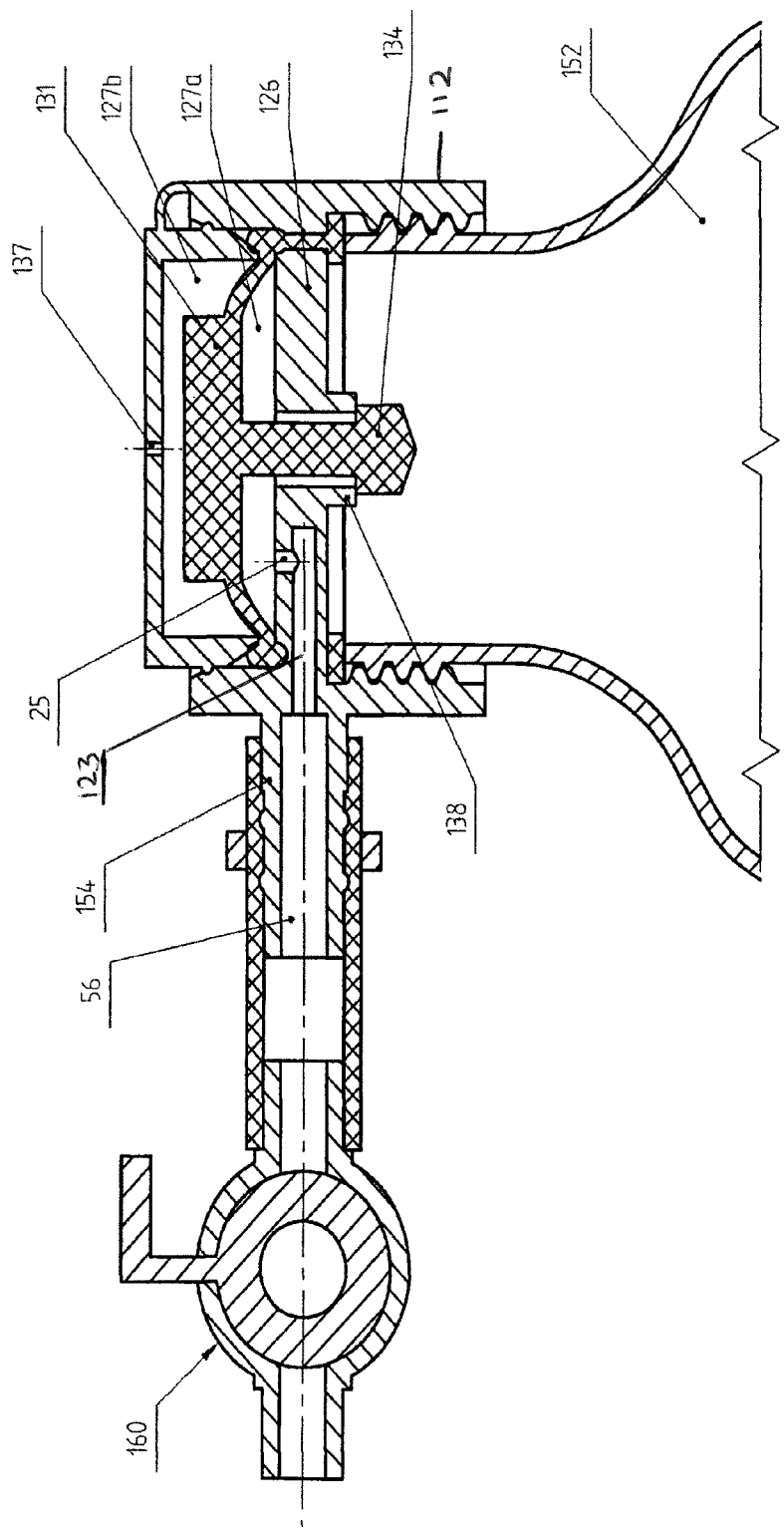
FIG. 5 illustrates a cross-sectional view of the second embodiment of the pressure regulating device during discharging a fluid when the valve is open.
Figure 6:
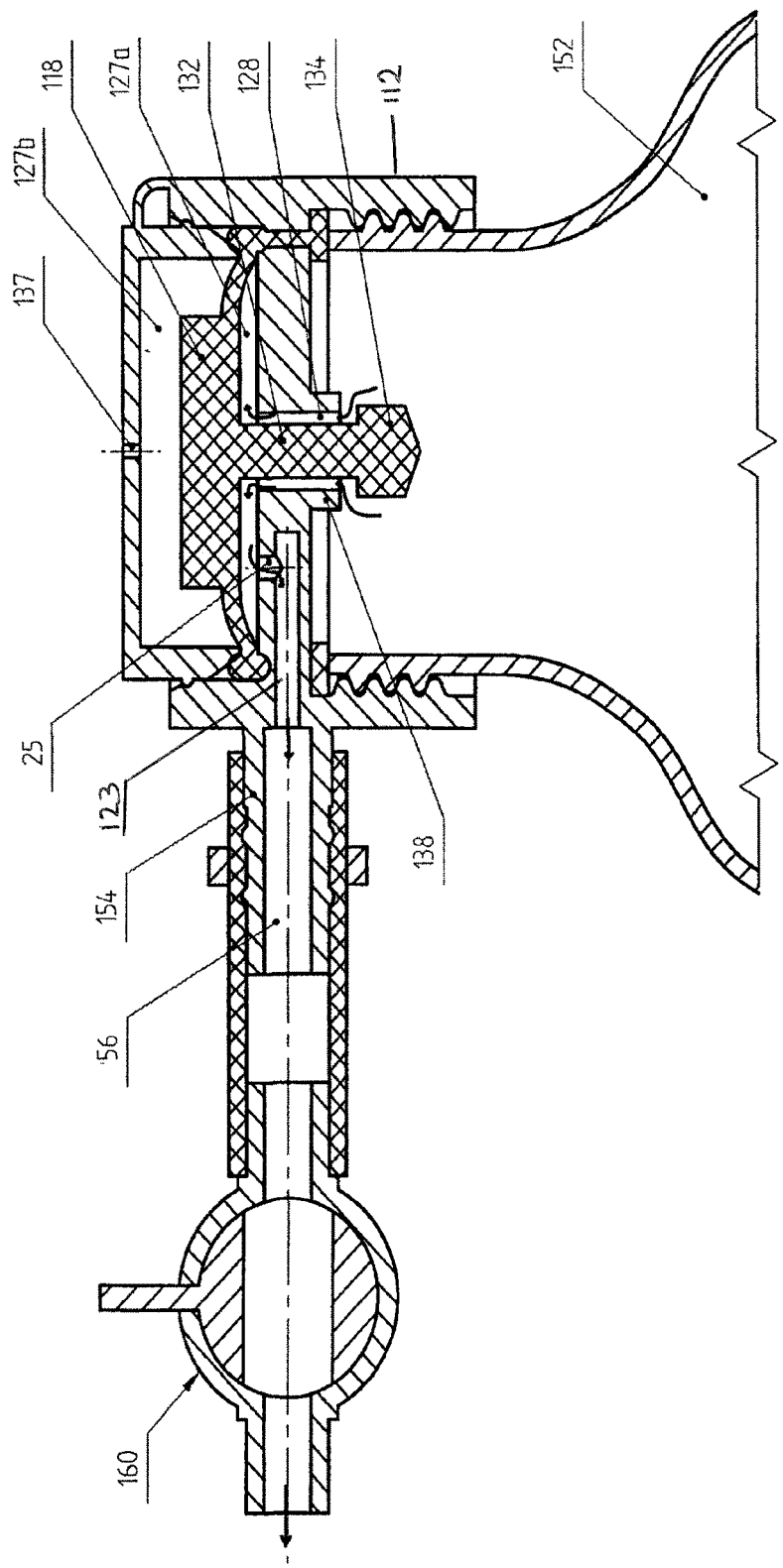
FIG. 6 illustrates a cross-sectional view of the second embodiment of the pressure regulating device during discharging a fluid when the valve is closed.
Figure 7:
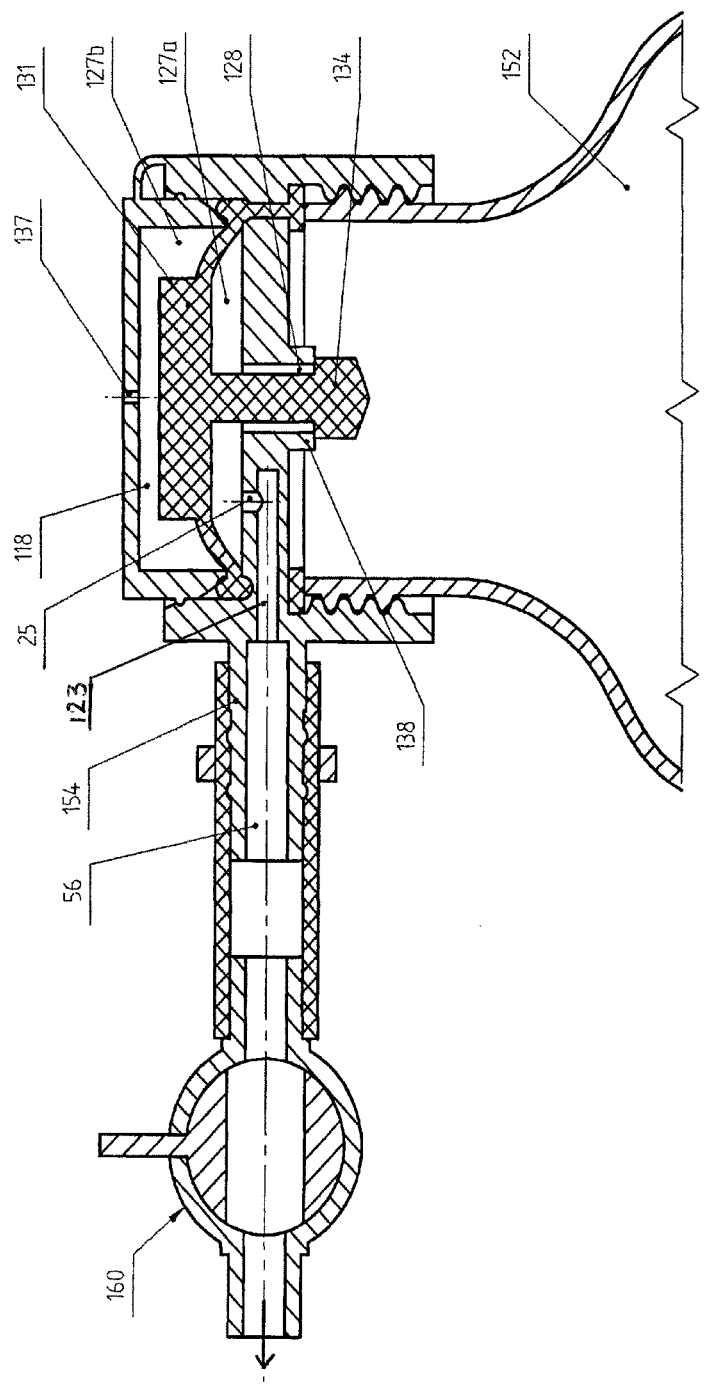
FIG. 7 illustrates a cross-sectional view of the second embodiment of the pressure regulating device after termination of discharging a fluid.

The operation of the pressure regulating device according to the invention will now be described with reference to FIGS. 4 to 8 illustrating cross-sectional views of a second preferred embodiment of the pressure regulating device in its initial state (FIG. 4), during discharging a fluid when the valve is open (FIG. 5) and when the valve is closed (FIG. 6), and after termination of discharging a fluid (FIG. 7). This second embodiment is shown as coupled to a pressurized fluid supply, in this case to a gas cartridge 150 forming a pressurized fluid supply containing a pressurized gas 152. The housing 112 is provided with an outlet nozzle 154 to direct the reduced pressure fluid to a fluid dispenser 160, forming a fluid receiving space such as a tap, through a connection pipe 158, for example. The fluid dispenser 160 is adapted to open and close the flow path of the reduced pressure gas discharged from the diaphragm chamber 118 of the device.

Figure 4:
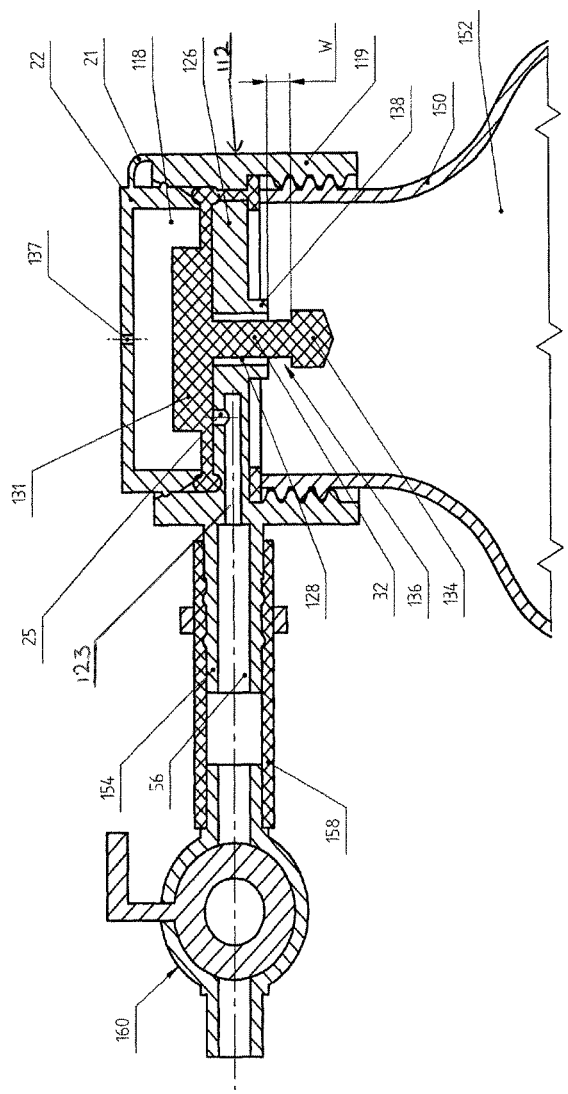
FIG. 4 illustrates a cross-sectional view of a second embodiment of the pressure regulating device according to the invention in its initial state.

As shown in FIG. 4, after mounting the pressure regulating device to said gas cartridge 150 in a gas-tight manner (in this example, by coupling the threaded flange 119 of the housing 12 to a corresponding threaded neck portion of the gas cartridge 150), the diaphragm 131 takes an initial position until a high pressure of the gas 152 is generated inside the gas cartridge 150. In the initial state of the device, the diaphragm 131 is also in its initial state, wherein the elastic diaphragm 131 is in a flat and tight condition, extending over and contacting with the barrier wall 126.

Accordingly, the throttle head 134 is in an open position to provide a free flow path for the pressurized gas 152 through the flow passage within the central port 128.

While the pressure of the gas 152 in the gas cartridge 150 increases, the gas 152 tends to flow through the central port 128 into the inner space portion 127a of the diaphragm chamber 118 underneath the diaphragm 131 and into the connecting ducts up to the closed fluid dispenser 160, thus also raising the diaphragm 131 which tends to be increasingly tensioned. At the same time, the throttle head 134 is also moving towards the barrier wall 126 thus reducing the flow area of the orifice 136. When due to a substantially high pressure of the gas 152, the throttle head 134 reaches the barrier wall 126 (or the valve seat 138 of the barrier wall 126), rising of the throttle head 134 terminates. At this moment a steady state of the diaphragm assembly come to exist and is maintained while the fluid dispenser 160 is held closed. This steady state of the pressure regulating device is illustrated in FIG. 5.

After opening the flow path in the fluid dispenser 160 so as to discharge the gas 152 from the gas cartridge 150, the pressure in the inner space portion 127a of the diaphragm chamber 118 drops and then the diaphragm assembly starts to oscillate between an opening and a closing position as shown in FIGS. 6 and 7, respectively. In the opening position, the gas 152 flows through the central port 128, the inner space portion 127a of the diaphragm chamber 118, the fluid discharging passage 123 and the outlet nozzle 154, indicated by small arrows, to the fluid dispenser 160, which allows the gas 152 to flow therethrough into a receiving space. This situation is shown in FIG. 6.

When due to the increased pressure in the inner space portion 127a, the diaphragm 131 is raised so high that the throttle head 134 closes the central port 128, as shown in FIG. 7, flow of the gas 152 into the inner space portion 127a of the diaphragm chamber 118 stops and the gas portion remaining in the downstream section of the flow path will flow out while the gas pressure in the inner space portion 127a underneath the diaphragm 131 tends to decrease. At the same time, due to said decrease of the pressure in the inner space portion 127a of the diaphragm chamber 118, the diaphragm 131 tends to return to its initial position, while increasing the distance W between the throttle head 134 and the valve seat 138 of the barrier wall 126. As the central port 128, in turn, becomes open, the pressurized gas 152 tends to flow again through the central port 128 into the inner space portion 127a of the diaphragm chamber 118, as already shown in FIG. 6. This oscillation of the elastic diaphragm assembly results in an oscillating gas pressure in the inner space portion 127a, the mean value of which may be preset as a regulated pressure by an appropriate design and dimensioning of the various components of the pressure regulating valve.

When a ventilation hole 137 is formed through the wall of the outer space portion 127b of the diaphragm chamber 118, the air in said outer space portion is not subject to compression by the rising diaphragm 131, but it is released through the ventilation hole 137 to the ambient environment. Similarly, when the diaphragm 131 moves back, no vacuum will develop in said outer space portion 127b, but some air will be sucked from the ambient environment through the ventilation hole 137 into said outer space portion 127b. Due to the relatively very small displacement and the high oscillation frequency of the diaphragm 131, an appropriate dimensioning of the ventilation hole 137 results in a practically negligible effect to the operation of the diaphragm 131.

The regulated pressure is primarily determined by the elastic constant of the diaphragm and the initial distance between the throttle head 134 and the valve seat 138 (i.e. the width W). Obviously, the larger the surface of the diaphragm 131 is and the smaller the flow area at the central port 128 is, the more uniform pressure in the inner space portion 127a can be achieved, thus providing a more sensitive pressure regulating device.

Although operation of the pressure regulating device has been described through gas pressure regulation with reference to FIGS. 4 to 7, the device may equally be used for regulating the reduced pressure of a liquid stored in a pressurized liquid container or cartridge. In this latter case, the liquid may be discharged at a reduced and regulated pressure into any kind of liquid reservoir, including open reservoirs, like as a vessel or a glass, and closed reservoirs, like a container or a tapped bottle.

While there have been described and illustrated only a few preferred embodiment of a pressure regulating device in accordance with the invention, it will be appreciated by a person skilled in the art that many changes may be made therein without departing from the spirit of the invention.

The invention claimed is:

1. A pressure regulating device adapted to be interposed between a pressurized fluid supply and a fluid receiving space into which pressurized fluid is discharged at a regulated reduced pressure, said device comprising
   a housing having
      a means for coupling to said pressurized fluid supply in a sealed manner, and
      a diaphragm chamber adapted to communicate with said fluid receiving space through a fluid discharging passage and being separated from said pressurized fluid supply by a barrier wall, such that pressure of said pressurized fluid exerts on a first side of said barrier wall, said barrier wall having a central port extending therethrough, and
   a diaphragm assembly having
      an elastic diaphragm connected to a throttle head by a stem,
      said stem extending through said central port to define a flow passage therein, and
      said diaphragm, being secured along a periphery of said diaphragm to said housing so that in an initial position, the diaphragm rests on a planar surface of said barrier wall, at a second side of said barrier wall, opposite the first side,
wherein said housing is made of a rigid gas-tight plastic material, and
wherein said diaphragm, said stem and said throttle head are integrated into one piece of the diaphragm assembly, said integrated piece of the diaphragm assembly being made of a gas-tight elastomeric material,
wherein the elastic diaphragm comprises a seal for sealing against a container comprising the pressurized fluid supply.

2. The pressure regulating device according to claim 1, wherein the housing is made of an injection-mouldable plastic material.

3. The pressure regulating device according to claim 2, wherein the plastic material is a high-density polyethylene or polypropylene.

4. The pressure regulating device according to claim 1, wherein said integrated piece of the diaphragm assembly is made of an injection-mouldable thermoplastic material.

5. The pressure regulating device according to claim 1, wherein the diaphragm has a central portion having an increased thickness relative to said periphery of the diaphragm.

6. The pressure regulating device according to claim 1, wherein the diaphragm chamber has a ventilation port communicating with an ambient environment.

7. The pressure regulating device according to claim 1, wherein an outer space portion of the diaphragm chamber is closed and filled with a gas at a pressure greater than an ambient pressure.

8. The pressure regulating device according to claim 1, wherein the diaphragm chamber has a bidirectional valve through which gas can be filled into or released from an outer space portion of the diaphragm chamber.

9. The pressure regulating device according to claim 1, wherein the fluid discharging passage extends through the barrier wall.

10. The pressure regulating device according to claim 1, wherein the diaphragm chamber comprises part of said pressurized fluid, wherein the pressurized fluid is a pressurizing gas for a pressurized liquid and the fluid receiving space is defined by an internal gas space of a pressurized liquid dispensing device.

11. The pressure regulating device according to claim 1, wherein the fluid is a pressurized liquefied gas and the fluid receiving space is defined by a liquid reservoir for containing a liquid to be pressurized by said gas.

12. A pressure regulating device adapted to be interposed between a pressurized fluid supply and a fluid receiving space into which pressurized fluid is discharged at a regulated reduced pressure, said device comprising
   a housing having
      a means for coupling to said pressurized fluid supply in a sealed manner, and
      a diaphragm chamber adapted to communicate with said fluid receiving space through a fluid discharging passage and being separated from said pressurized fluid supply by a barrier wall, such that pressure of said pressurized fluid exerts on a first side of said barrier wall, said barrier wall having a central port extending there through, and
   a diaphragm assembly having
      an elastic diaphragm connected to a throttle head by a stem,
      said stem extending through said central port to define a flow passage therein, and
      said diaphragm, being secured along a periphery of said diaphragm to said housing so that in an initial position the diaphragm rests on an upper surface of said barrier wall, at a second side of said barrier wall, opposite the first side,
wherein said housing is made of a rigid gas-tight plastic material, and
wherein said diaphragm, said stem and said throttle head are integrated into one piece of the diaphragm assembly, said integrated piece of the diaphragm assembly being made of a gas-tight elastomeric material,
wherein the housing is provided with a collar comprising the means for coupling the housing to a container comprising the pressurized fluid supply,
wherein the elastic diaphragm comprises a seal for sealing against said container comprising the pressurized fluid supply.

13. A pressure regulating device according to claim 12, wherein the collar comprises screw threads or a snap fitting.

14. A pressure regulating device adapted to be interposed between a pressurized fluid supply and a fluid receiving space into which pressurized fluid is discharged at a regulated reduced pressure, said device comprising
   a housing having
      a means for coupling to said pressurized fluid supply in a sealed manner, and
      a diaphragm chamber adapted to communicate with said fluid receiving space through a fluid discharging passage and being separated from said pressurized fluid supply by a barrier wall, such that pressure of said pressurized fluid exerts on a first side of said barrier wall, said barrier wall having a central port extending therethrough, and
   a diaphragm assembly having
      an elastic diaphragm connected to a throttle head by a stem,
      said stem extending through said central port to define a flow passage therein, and
      said diaphragm, being secured along a periphery of said diaphragm to said housing so that in an initial position, the diaphragm rests on a planar surface of said barrier wall, at a second side of said barrier wall, opposite the first side,
wherein said housing is made of a rigid gas-tight plastic material,
wherein the elastic diaphragm comprises a seal for sealing against a container comprising the pressurized fluid supply.

15. A beverage container comprising a pressure regulating device interposed between a pressurized fluid supply and a space comprising a beverage into which space pressurized fluid is discharged from the pressurized fluid supply at a regulated reduced pressure, said pressure regulating device comprising a housing coupled to said pressurized fluid supply in a sealed manner, and a diaphragm chamber communicating with said fluid receiving space through a fluid discharging passage and being separated from said pressurized fluid supply by a barrier wall having a central port extending therethrough, and
   a diaphragm assembly having
      an elastic diaphragm connected to a throttle head by a stem,
      said stem extending through said central port to define a flow passage therein, and
      said diaphragm, being secured along a periphery of said diaphragm to said housing so that in an initial position, the diaphragm rests on a planar upper surface of said barrier wall,
wherein said diaphragm, said stem and said throttle head are integrated into one piece of the diaphragm assembly,
   wherein the elastic diaphragm comprises a seal for sealing against a container comprising the pressurized fluid supply.

* * * * *